United States Patent
Hala et al.

(10) Patent No.: US 6,937,941 B2
(45) Date of Patent: Aug. 30, 2005

(54) IMPULSE MONITORING SYSTEM: APPARATUS AND METHOD

(75) Inventors: Roger A. Hala, Gardnerville, NV (US); Brian F. Howard, Issaquah, WA (US)

(73) Assignee: Bently Nevada, LLC, Minden, NV (US)

( * ) Notice: Subject to any disclaimer, the term of this patent is extended or adjusted under 35 U.S.C. 154(b) by 0 days.

(21) Appl. No.: 10/718,909

(22) Filed: Nov. 20, 2003

(65) Prior Publication Data

US 2005/0114044 A1 May 26, 2005

(51) Int. Cl.$^7$ ................................................ G01B 3/00
(52) U.S. Cl. .................... 702/33; 702/126; 702/189; 73/660; 341/122; 341/126; 341/155
(58) Field of Search ............................ 702/33, 54–56, 702/126, 182, 183, 189; 73/659, 660, 649; 341/110, 126, 155, 122

(56) References Cited

U.S. PATENT DOCUMENTS

| | | |
|---|---|---|
| 4,614,117 A | 9/1986 | Taniguti |
| 5,808,903 A * | 9/1998 | Schiltz et al. ................. 702/56 |
| 6,006,164 A * | 12/1999 | McCarty et al. ............... 702/56 |
| 6,026,348 A * | 2/2000 | Hala ............................ 702/56 |
| 6,507,804 B1 * | 1/2003 | Hala et al. ................... 702/182 |
| 6,789,030 B1 * | 9/2004 | Coyle et al. .................. 702/77 |

FOREIGN PATENT DOCUMENTS

FR   2767253   2/1999

* cited by examiner

Primary Examiner—Bryan Bui
Assistant Examiner—Hien Vo
(74) Attorney, Agent, or Firm—Dennis A. DeBoo

(57) ABSTRACT

A system for determining impulse events of an asset by sampling and digitizing a complex signal sensed by a transducer monitoring the asset into a digitized signal with a sampling device operatively coupled to the transducer, transforming the digitized signal into a plurality of maximum and minimum value pairs each pair having an associated location correlated to a relative movement of a moving member of the asset with a processor operatively coupled to the sampling device, and a monitor and/or a computerized condition monitor having the processor integrally formed therewith or operatively coupled thereto for comparing at least one of the plurality of maximum and minimum value pairs and its respective location to at least one known value for determining impulse events based on the comparison step for providing asset protection.

18 Claims, 12 Drawing Sheets

IMPULSE MONITORING SYSTEM: APPARATUS AND METHOD

BACKGROUND OF THE INVENTION

This invention relates generally to signal processing systems for monitoring assets, and, in particular, to an impulse monitoring system: apparatus and method for monitoring impulse events of assets such as rotating and reciprocating machines.

Machine operation causes characteristic sounds as a result of mechanical movement, forces acting on bearing surfaces, and process fluid and gas flows. These sounds are a result of energy being expended in the machine. Hence, the term impulse events is used since loose parts, excessive clearances, sticking parts, inadvertent metal-to-metal contacts, and other events cause many of the destructive events that can occur in a machine. These events result in the knocks, bangs, clanks, that indicate a machine problem. Hence, these sounds are characteristic of an impulse similar to the machine being struck by a hammer.

Historically, the determination whether these sounds were normal or not was done by the human ear listening and comparing the present sound with a previously remembered sound. The human ear is quite good at detecting a wide frequency range of sounds, detecting relative magnitudes, and discerning patterns or irregularities in patterns of sounds. However, among other thing, the ear has difficulty detecting sounds, particularly low level sounds, amidst adjoining loud noise.

Technology has allowed sensing machine operation sounds by using inertial sensors sensing acceleration or velocity of, for example, a machine case of a machine or by using microphones to detect sound pressure in the vicinity of the machine to remove the inconsistency of the human ear. Systems employing these sensors can detect and record sounds undetectable by the human ear particularly, lower levels sounds amidst adjoining loud noise.

However, to continuously sample a sound to detect the complete range of frequencies emitted, to compare them over a complete cycle of a machine, and to maintain a history for comparison is problematic in that it requires an enormous amount of data storage. Even by taking a periodic sample of the sound having enough data to make a comparison with historical data requires large amounts of storage.

One specific example of a machine that exhibits noisy normal operation is a reciprocating compressor which typically includes an installation of accelerometers above the crosshead and velocity sensors on the crankcase to detect large impulse events that indicate that the compressor is experiencing a problem. To detect these events, the detection level had to be set above the normal operating level of the compressor. With the detection set above normal operation, the identification of emerging problems is done by observing the dynamic waveform data to try to identify lower level impulse events and to correlate them to compressor operation to determine the probable cause.

However, this approach is problematic since the acceleration waveform has significant high frequency content such that if the waveform of a complete cycle was observed at a sample rate that was low enough to cause aliasing of the waveform the high frequency portion and the accompanying impulse event could be lost. On the other hand, if the sample rate were increased to see the high frequency components, the entire cycle could not be seen and only the very early part of the cycle could be seen. In both of these scenarios, the impulse events could be missed when looking at the waveform.

Hence, there is a need for an apparatus and method that solves the problem of determining impulse events of a machine particularly amidst adjoining loud noise, that solves the problem of the requirement for large amounts of data storage, and that solves the problem of signal processing resulting in the loss of high frequency portions and accompanying impulse events of machines.

BRIEF SUMMARY OF THE INVENTION

This invention is distinguished over the known prior art in a multiplicity of ways. For one thing, one embodiment of the invention provides a system: apparatus and method for determining impulse events of a machine particularly amidst adjoining loud noise by determining a location of an impulse event of an asset for determining an event timing to be able to accomplish event correlation to other machine events (such as suction and discharge valve operation, rod reversal, et cetera), and for determining relative magnitudes of the events so they can be compared historically to previous records. Additionally, one embodiment of the invention provides an apparatus and method for compressing data for solving the problem of the requirement of large amounts of data storage. Furthermore, one embodiment of the invention provides an apparatus and method for retaining impulse events of machines during signal processing.

In one embodiment of the invention, a method for determining impulse events of a machine correlative to machine status includes the steps of: monitoring a machine with at least one transducer outputting an electrical signal correlative to machine status; sampling the electrical signal into a digitized signal; transforming the digitized signal into a plurality of digital packets by determining for each of the plurality of digital packets a maximum and a minimum value of the digitized signal taken over a sampling range correlated to a predefined degree of rotation of a rotating element of the machine and each of the plurality of digital packets having a location defined by the correlated predefined degree of rotation of the rotating element over which it was sampled, and comparing the values of the plurality of digital packets to known values; and determining impulse events based on the comparison step. The above method can further include the step of filtering the digitized signal prior to the transforming step. The above method can further include the step of alarming off each determined impulse event as warranted for by a criterion of the comparison step.

In another embodiment of the invention, an apparatus for determining impulse events of a machine from a electrical signal outputted by a transducer monitoring the machine is comprised of: an analog to digital converter operatively coupled to the transducer for sampling and digitizing the electrical signal into a digitized electrical signal; a processor operatively coupled to the sampling device for receiving the digitized electrical signal and including means for transforming the digitized electrical signal into a plurality of digital packets each having a maximum and a minimum value taken over a sampling range correlated to a predefined degree of rotation of a rotating element of the machine and each of the plurality of digital packets having a location defined by the correlated predefined degree of rotation of the rotating element over which it was sampled; the processor further including means for comparing the plurality of maximum and minimum values of the plurality of digital packets and their respective locations to known values, and means for determining impulse events based on the comparison step. The above method can further include a filter operatively coupled to the processor for filtering the digitized signal prior to transforming the digitized electrical signal into said plurality of digital packets. The above method can further include an alarm operatively coupled to said processor for alarming off each determined impulse as warranted for providing machine protection and wherein the alarm can include means for informing plant personal for each determined impulse as warranted for providing machine protection.

In another embodiment of the invention, a system is comprised of: at least one transducer operatively coupled to an asset for measuring physical asset parameters and outputting an electrical signal correlative to asset status; a sampling device operatively coupled to the transducer for sampling and digitizing the electrical signal into a digitized signal; a first processor operatively coupled to the sampling device for receiving the digitized signal and transforming it into a plurality of digital packets each having a maximum and a minimum value taken over a sampling range having a predefined degree of movement of an moving element of the asset and each of the plurality of digital packets having a location defined by the predefined degree of movement of the moving element over which it was sampled, and a second processor operatively coupled to the first processor and including means for comparing the plurality of digital packets and their respective locations to known values and means for determining impulse events based on the comparison step.

Moreover, having thus summarized the invention, it should be apparent that numerous modifications and adaptations may be resorted to without departing from the scope and fair meaning of this invention as set forth herein below by the claims.

DETAILED DESCRIPTION OF THE INVENTION

Figure 1:
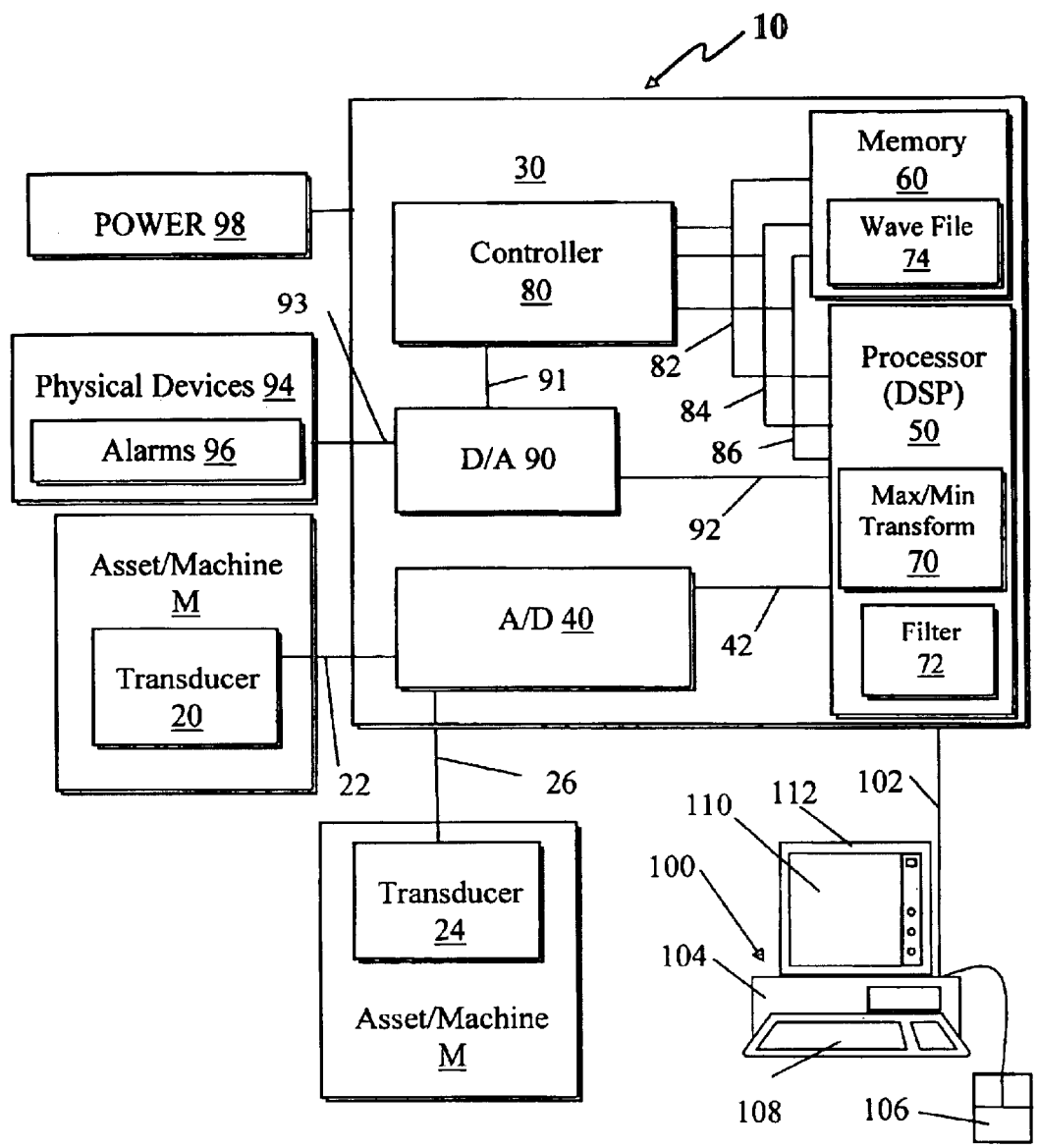
FIG. 1 is a functional block diagram view of an impulse monitoring system.

Considering the drawings, wherein like reference numerals denote like parts throughout the various drawing figures, reference numeral 10 is directed to a impulse monitoring system: apparatus and method for determining impulse events of assets in the form of, for example, rotating and/or reciprocating machines.

In its essence, and referring to the drawings, an embodiment of the invention provides a system 10: apparatus and method for receiving, digitizing, transforming, compressing, storing, transmitting, and displaying transducer measurement data correlative to machine status in which the measurement data is continuously sensed by at least one transducer 20, and digitized, transformed, compressed, and displayed by monitor 30 and computerized monitoring system 100 for determining impulse events of machines by, for example, comparing relative magnitudes to other known magnitudes or other measurements of the machine and/or relative to its own history (e.g., is it getting stronger or weaker) and identifying emerging problems, correlating them to machine operation to determine probable cause, and formulating some proactive action to alleviate the problem. The system 10 also determines an event timing to be able to accomplish event correlation to other machine events (such as suction and discharge valve operation, rod reversal, et cetera), and determines relative magnitudes of the events so they can be compared historically to previous records.

More specifically, and referring to FIG. 1, one embodiment of the system 10 is comprised of a monitor 30 including a sampling/digitizing device or analog to digital converter (A/D) device 40, a processing device 50, and an associated memory 60. The analog to digital converter 40 is operatively coupled to at least the one transducer 20 via connection 22 and also to the processing device 50 via connection 42. In turn, the processing device 50 is operatively coupled to the associated memory 60 as discussed below and includes a maximum and minimum (Max/Min) transform means 70 and a filter means 72.

Each transducers 20, 24 can take the form of a seismic or inertial transducer which is operatively coupled to an asset such as machine M for making, for example, bearing housing, casing, or structural vibration measurements from the machine and each outputting analog transducer measurements or an analog electrical signal indicative machine status. Seismic transducers are well known in the art and a wide variety of seismic transducers such as velocity transducers and acceleration transducers are manufactured by Bently Nev., LLC, 1631 Bently Parkway South, Minden; Nev., USA 89423.

At least one transducer 20 is operatively coupled, via connection 22, to the analog to digital converter device 40 for receiving, sampling and digitizing the analog signal from at least the one transducer 20 indicative of asset or machine status and transmitting the digitized signal to processing device 50 via connection 42. The processing device 50 can provide a control signal to the analog to digital converter device 40 for sampling the analog signal at, for example, a known sampling rate. Additionally, the processing device 50 can be comprised of one or more processors each having an associated memory such as one or more digital signal processors (DSP) 50 and associated memory 60.

The processing device 50 receives the digitized signal outputted from the analog to digital converter device 40 via connection 42 and, in turn, preferably employs filter 72 for filtering the sampled waveform with, for example, a low pass such as a Butterworth filter and then, the processing means employs the max/min transform means 70 for determining a plurality of maximum and minimum sample or digital packets each comprising a maximum and a minimum value from a plurality of samples of the filtered digitized signal taken during predefined degrees of rotation of a rotating element of the asset for defining a location and a maximum and minimum value to each of the plurality of digital packets wherein each digital packet location is defined by each predefined degree of rotation of the rotating element thereby transforming the analog signal outputted by at least the one transducer 20 into the plurality of maximum and minimum sample or digital packets each having a unique identified location.

The system 10 then further compresses the analog signal outputted by the transducer 20 by only storing in memory 60, preferably consecutively, each maximum and minimum value in each digital packet including its associated location, for example, first a maximum and then a minimum per each predefined degree of rotation for defining a waveform of maximum and minimum values associated with a unique location or predefined degree of rotation. Monitor 30 may be used to compare the maximum and minimum values and locations to previously known values for determining impulse events based on the comparison step such as, for example, having at a particular location a maximum and/or minimum meeting or exceeding a predefined criteria based on the previously known values.

Furthermore, and in one embodiment of the invention, FIG. 1 shows that the monitor 30 can also include a controller or microcontroller 80 operatively coupled to the processing device 50 such that the processing device 50 and associated memory 60 are connected, via connections 82 (data bus), 84 (address bus), and 86 (control lines), to each other and to the controller 80. The monitoring system 30 and thus, the processor 50 including the max/min transform 70 and filter 72, may be programmed via the microcontroller 80 or other external computer.

Additionally, and in one embodiment of the invention, the system 10 is further comprised of a computerized condition monitor 100 operatively coupled to the monitoring system 30 via connection 102. The computerized condition monitor 100 can be a laptop, notebook, desktop, networked, and/or a distributed computer or the like. Computerized condition monitor 100 is generally comprised of software running on a processing and storage means or device 104 comprised of a processor, memory, and storage medium. The processing and storage device 104 is operatively coupled to at least one entry device such as a selection or mouse device 106, and/or a keyboard 108 and also, to a graphical user interface 10 including a display 112. Communication between a user, the processing and storage device 104, and the monitor 30 is done through the graphical user interface 10 such that the computerized condition monitor 100 can be employed for displaying, for comparison, the defined maximum and minimum value waveform with a known waveform and/or criteria for determining any impulse events based on the comparison step which can be done visually or computationally via the computerized condition monitor 100.

The computerized condition monitor 100 and monitor 30 can be programmed to provide bi-directional communication via connection 102 and thus, provide the means for communicating, among other things, the digitized analog electrical signals engendered from the transducer 20 and transformed by the monitor 30 and transmitted to the computerized condition monitor 100 for displaying, for comparison purposes, the defined maximum and minimum waveform with a known waveform and for determining any impulse events based on the comparison step such as by having the maximum and/or minimum at a location meeting or exceeding a predefined criterion for a same location on the known waveform. Hence, impulse events can be determined visually or computationally via the system 10.

The monitor 30 can further include a digital to analog converter 90 operatively coupled to the controller 80 via connection 91, to the processing device 50 via connection 92, and/or to the computerized condition monitor 100 via connection 102 for providing, for example, means for receiving and conveying information, via connection 93, to physical output devices 94 such as relay outputs, current output such as 4–20mA outputs, and communication links between processors or monitors and other external platforms for, among other things, generating alarms 96 based on determined impulse events and using the alarms to automatically shut down the machine M being monitored by at least the one transducer 20 and/or automatically annunciate machinery problems to operators and other plant personnel.

One or more power supplies 98 are operatively coupled to provide any required power to transducers 20, 24, monitor 30, physical output devices 94, and/or computerized condition monitor 100.

Figure 2:
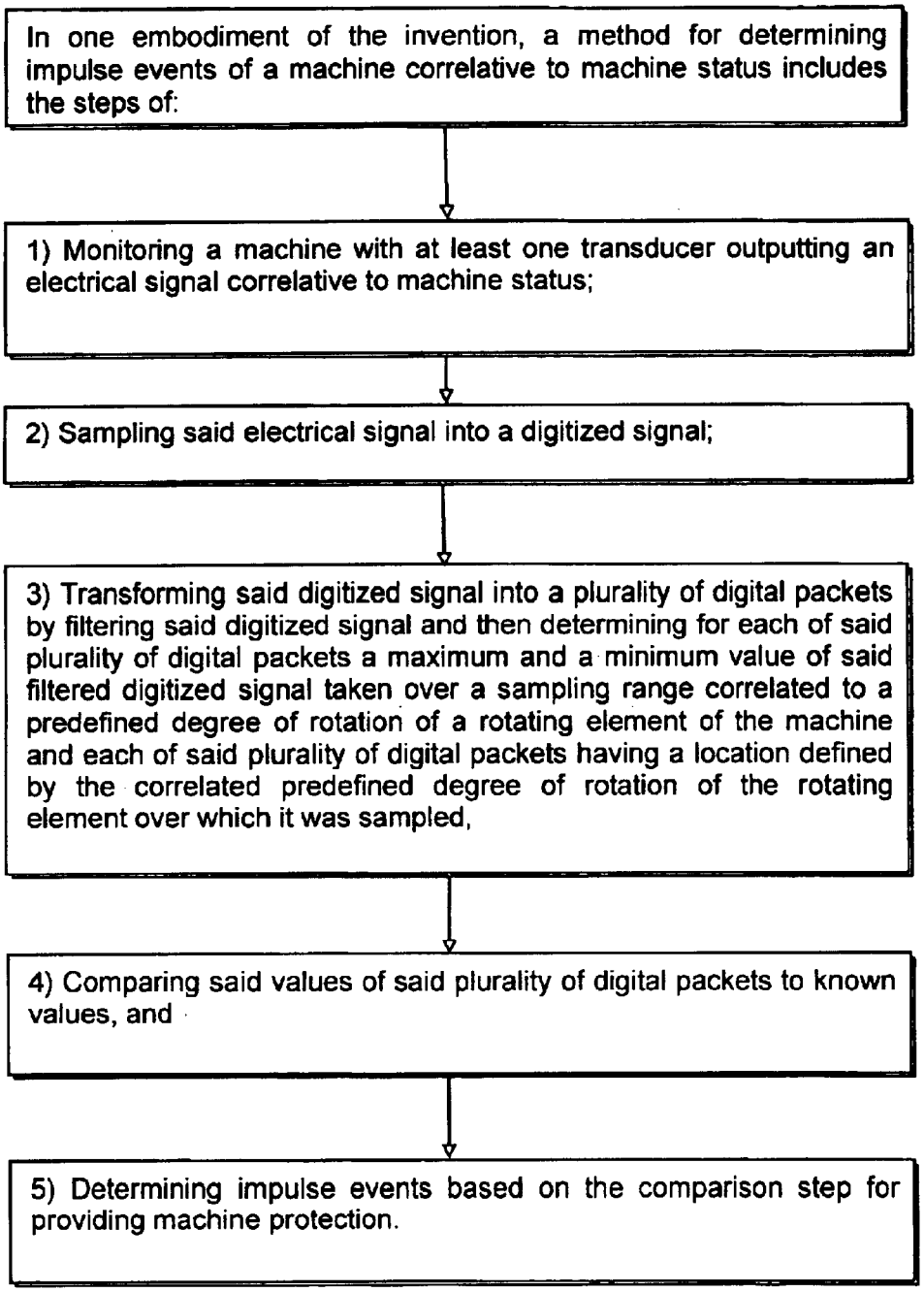
FIG. 2 is a general flowchart view of an impulse monitoring method.

Referring to FIG. 2, in combination with FIG. 1, and in light of the above description, one method embodiment of the invention for determining impulse events of a machine correlative to machine status includes the steps of: 1) monitoring a machine with at least one transducer outputting an electrical signal correlative to machine status; 2) sampling the electrical signal into a digitized signal; 3) transforming the digitized signal into a plurality of digital packets by determining for each of the plurality of digital packets a maximum and a minimum value of the digitized signal taken over a sampling range correlated to a predefined degree of rotation of a rotating element of the machine and each of the plurality of digital packets having a location defined by the correlated predefined degree of rotation of the rotating element over which it was sampled for transforming and compressing analog transducer measurements into the plurality of digital packets each having a unique location; 4) comparing the values of the plurality of digital packets to known values; and 5) determining impulse events based on the comparison step for providing machine protection.

The above steps in the above method can be further comprised of any one or more of the following: Step 1 can further include the step of monitoring vibration of a reciprocating or rotating machine with at least one transducer outputting an electrical signal correlative to machine status; Step 2 can further include the step of sampling and digitizing the electrical signal into a digitized vibration signal at a known sampling rate; Step 3 can further include the step of employing a digital signal processor and associated memory for transforming the digitized vibration signal into a plurality of digital packets by filtering the digitized vibration signal and then determining, for each of the plurality of digital packets, a maximum and a minimum value of the filtered digitized vibration signal taken over the sampling range correlated to a predefined degree of rotation of a rotating element of the machine and each of the plurality of digital packets having a location defined by the correlated predefined degree of rotation of the rotating element over which it was sampled for transforming and compressing analog transducer measurements or outputs into the plurality of digital packets each having a unique location for use in identifying impulse events based on the comparison step; Step 3 can further include the step of consecutively storing each of the plurality of digital packets and its associated location, for example, first a maximum and then a minimum per each predefined degree of rotation for defining a waveform of max/min values for each unique predefined degree of rotation; Step 4 can further include the step of displaying for comparison the defined waveform with a known waveform for determining any impulse events based on the comparison step such as by having the maximum and minimum meeting or exceeding a predefined criterion based on the known waveform for visually or computationally determining impulse events; Step 5 can further include the step of generating alarms based on impulse events determined based on the comparison step of comparing the maximum and minimum values at particular locations to previously known values and using the alarms to automatically shut down the machine being monitored by the transducer and/or automatically annunciate machinery problems to operators and other plant personnel.

A specific example follows for further explaining the system 10 (apparatus and method) and how the system 10 solves the problems discussed hereinabove.

To describe the solution by way of example, data was taken from a hydrogen compressor crosshead and valve cover using accelerometers such as transducers 20, 22 coupled to the hydrogen compressor asset M. The data was gathered from these locations at a sample rate of 262.1 k samples per second. The machine was operating at 276 rpm so a single revolution is:

$$\frac{262.1 \text{ ksamples/sec}}{276 \text{ rpm}} = 262100*60 \text{ samples}/276 \text{ rev} = 56980 \text{ samples/rev}.$$

Figure 3:
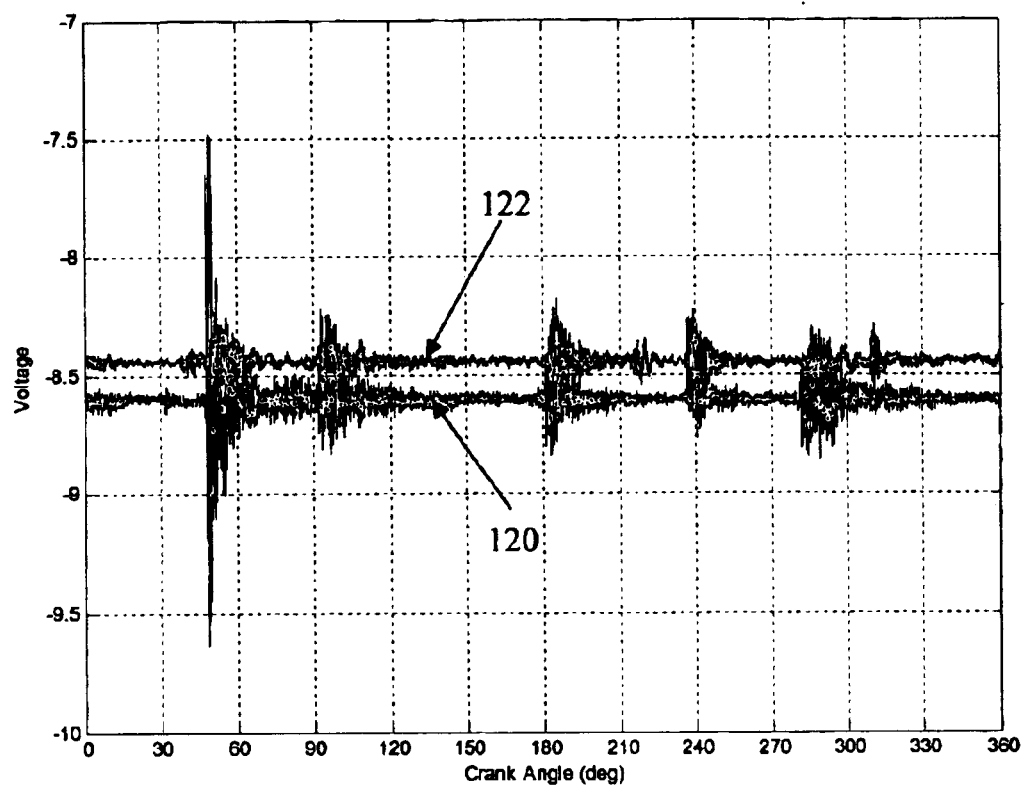
FIG. 3 is a graphical view of two plots of two signals from two transducers which have been sampled at a base line sample rate of 262,100 samples per second and plotted on a plot with voltage values versus crank angle in degrees.

This data was considered as the infallible truth and used as a guiding principle or base line for the system. FIG. 3 shows a graphical view of the base line data for a single revolution of throw number 2. The two plots on the graph represent the accelerometer data on the crosshead and on the suction valve. Specifically, FIG. 3 shows two plots 120, 122 of two signals from respective transducers 20, 24 being sampled at the base line sample rate of 262,100 samples per second or 56,980 samples per revolution and plotted with voltage values versus crank angle in degrees. The two plots 120, 122 on the graph of FIG. 3 represent, respectively, the accelerometer data on a crosshead and on a suction valve of the hydrogen compressor machine M.

Recognizing that the data sample rate of one typically used monitoring system is 64,000 samples per second, and that the base line data is sampled at a higher rate than the 64,000 samples per second rate resulted in the conclusion that the input data has to be decimated in order to represent the raw analog to digital samples that this typical monitor would have available to process. This data results in the plots shown in FIG. 4.

Figure 4:
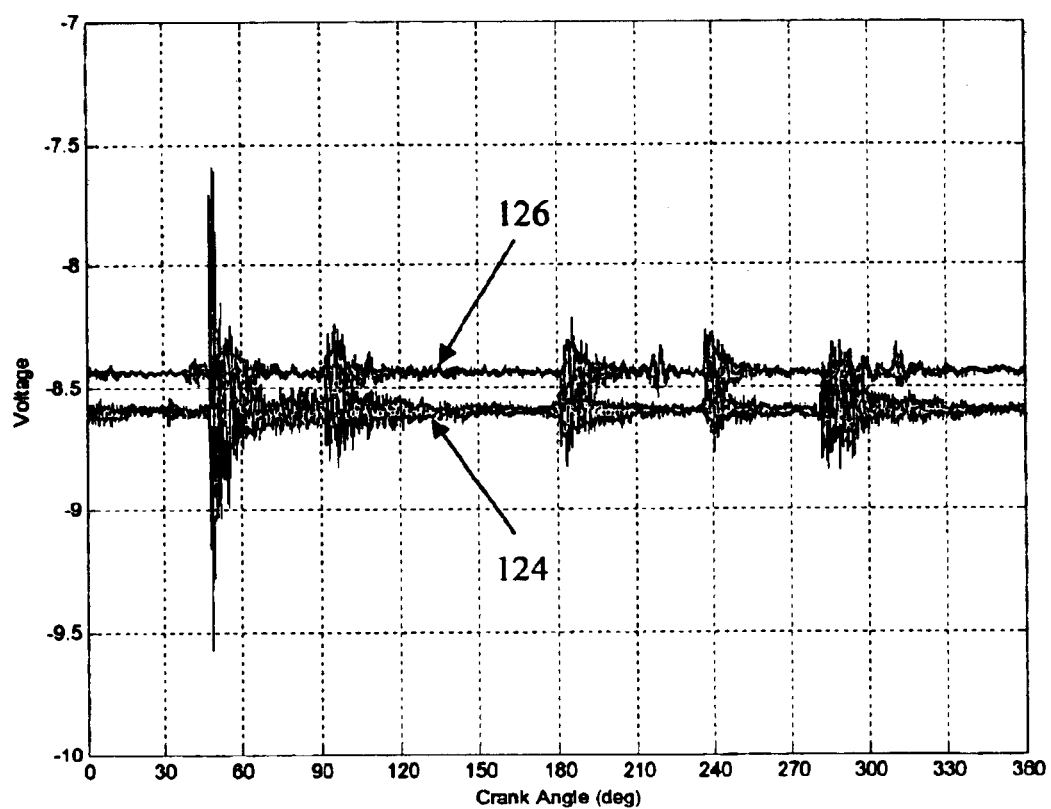
FIG. 4 is a graphical view of two plots of two signals from two transducers which have been sampled at 64,000 samples per second and plotted on a plot with voltage values versus crank angle in degrees.

Particularly, FIG. 4 is a graphical representation of two plots 124, 126 from the two signals from the two respective transducers 20, 24 which have been sampled at the 64,000 samples per second rate and plotted on a plot of voltage values versus crank angle in degrees. It can be seen from FIG. 4, in comparison with FIG. 3, that even at this sample rate, some of the high magnitude data around −7.5 and −9.5 volts does not show in the 64,000 samples per second data.

If we were able to plot every sample for each revolution of the crankshaft, the plot in FIG. 4 is what we would get, and represents the very best that this typical monitor could do if it could save every A/D sample for a revolution of the crankshaft. However, to accomplish this would require that the monitor support a 13,913-point waveform.

In contrast, data that is typically obtained from other measurement points in the reciprocating compressor application is set at 360 or 720 points per revolution. When set at 720 points, the waveforms are gathered by picking a sample every ½ degree of crankshaft rotation for a total of 720 points. So if we agree to only return 720 points for the cycle above, we can simulate this by performing the 720-point sample picking from the 64,000 samples per revolution data and would result in the waveform shown in FIG. 5.

Figure 5:
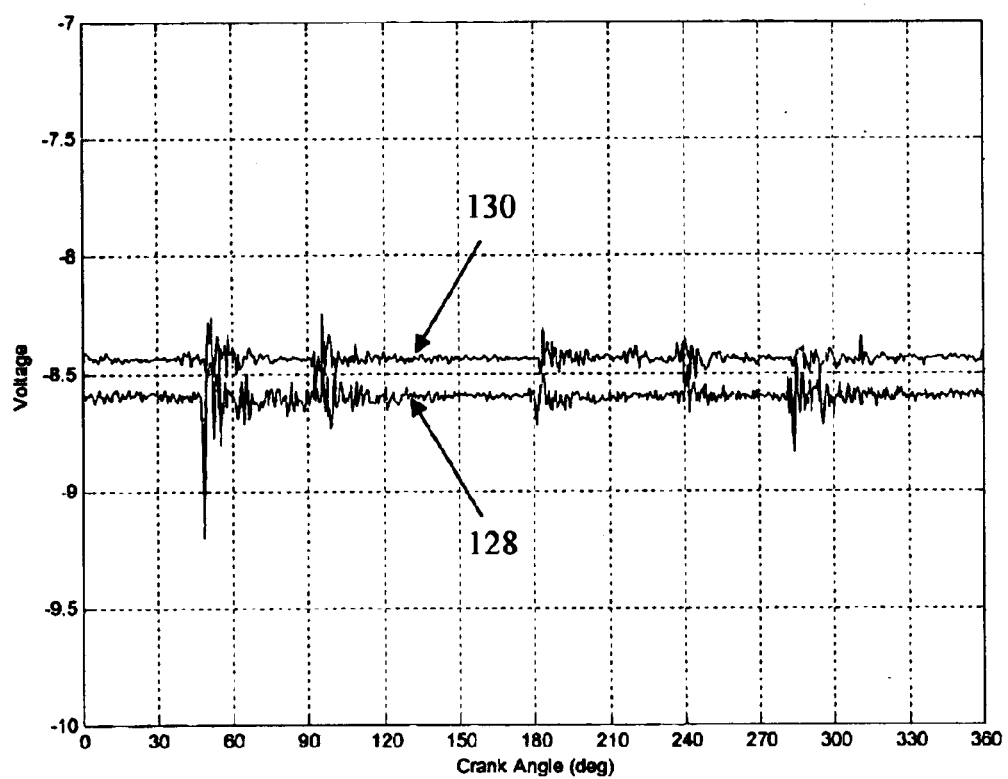
FIG. 5 is a graphical view of two 720-point sample plots obtained by picking 720 samples from each of the two 64,000 samples per revolution plots shown in FIG. 4.

FIG. 5 is a graphical view of two 720-point sample plots 128, 130 respectively obtained by picking 720 samples from each of the two 64,000 samples per revolution plots 124, 126 shown in FIG. 4. As can be seen, the data sample rate aliases the data so that the original waveform shape and content is severely changed. A requirement is that there will be an ability to correlate the impulse events to operational events in the compressor. Comparing the two plots reveals that the peak magnitudes have been altered and much of the form of the waveform has been lost. This is primarily due to the aliasing effect of sampling. From this plot it is difficult to determine what is a real impulse event and when aliasing gives the impression of an event. This plot emphasizes our conclusion that we must consider enough samples such as all of the analog to digital base line samples in a revolution to adequately describe the data shape.

Figure 6:
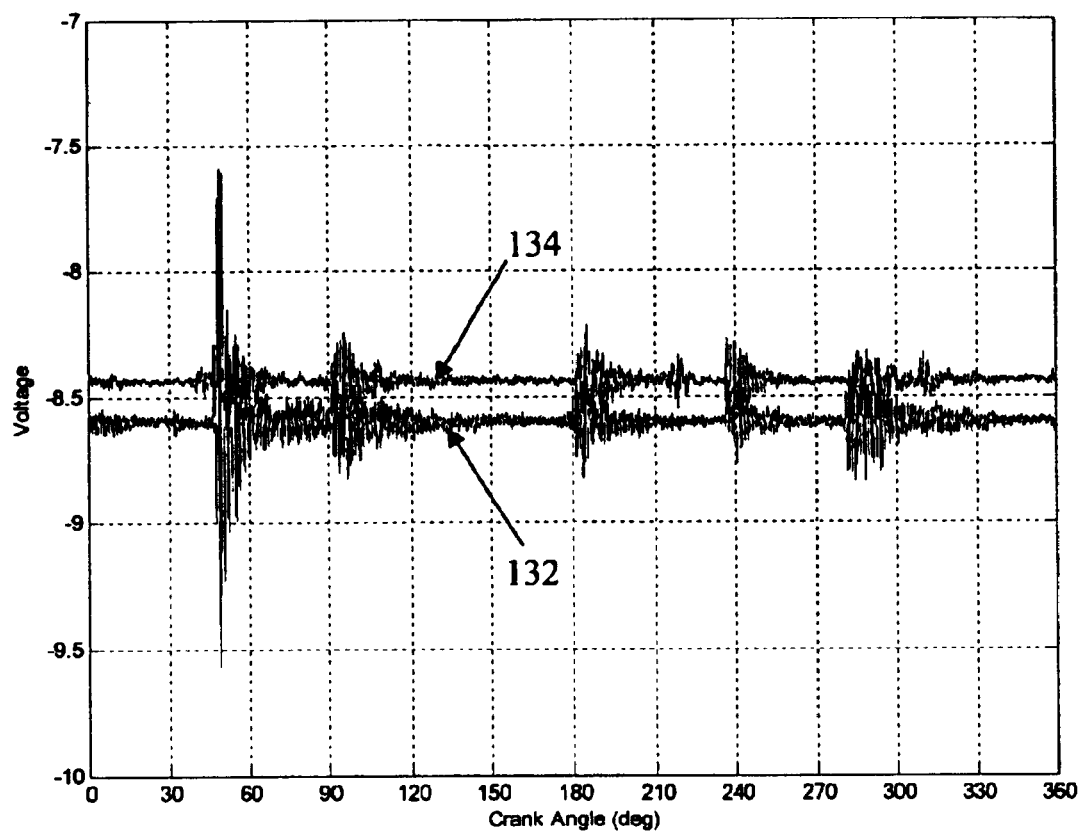
FIG. 6 is a graphical view of two 720-point sample plots obtained by 720 samples picked from results of the impulse monitoring system transforming each of the two 262,100 samples per revolution plots shown in FIG. 3.

Remember that our intent is to determine the magnitude and location of an impulse event, but still be able to present the data in an abbreviated set of data points such as no more than 720 points of data. Hence, in one aspect, the invention includes a method of preserving the information performing a process of looking at enough samples such as all base line samples, and for each degree (or fraction thereof) of crankshaft rotation determining the maximum and the minimum values and recording them. This gives us the highest and lowest points of the modulation to a 1-degree resolution (or fraction thereof) so we can accurately assess the location to within 1 degree (or fraction thereof) and the magnitude of the impulse event. Then, this data is alternatively (e.g. first the maximum then the minimum) stored in a waveform file in memory in monitor 30 and/or in computer 100 thereby resulting in a compressed 720 point data file. The result can then be plotted in the same fashion as other waveforms for comparison such as with other 720 points per revolution waveforms used in a reciprocating compressor plot group. FIG. 6 shows the resulting plot.

Specifically, FIG. 6 shows is a graphical view of two 720-point sample plots obtained by 720 samples picked from results of the impulse monitoring system transforming each of the two 262,100 samples per revolution plots shown in FIG. 3. That is, the system 10 uses, for example, all the base line samples and for each degree (or fraction thereof) of crankshaft rotation it determines the maximum and the minimum value for obtaining a plurality of maximum and minimum sample or digital packets, and then, records them resulting in a modulation envelope which is preserved, as are as the impulse data locations or events in the cycle as shown in FIG. 6. Hence, each maximum and minimum sample packet includes a unique location defined by each predefined degree of rotation of the rotating element such that the system 10 transforms analog transducer measurements into a plurality of maximum and minimum sample packets each having a unique location, and then continues to compress the analog transducer measurements by consecutively storing only the maximum and minimum packets and their associated locations, for example, first a maximum and then a minimum per each predefined degree of rotation for defining a waveform of maximum and minimum values for each unique predefined degree of rotation for further analysis such as comparing the max/min values to previously known values for determining any impulse events based on the comparison step such as by having the maximum and minimum meeting or exceeding a predefined criterion based on the previously known values. Additionally, in one embodiment of the invention the system 10 is further comprised of the computerized condition monitor 100 operatively coupled to the monitoring system 30 for displaying for comparison the defined waveform with a known waveform and for determining any impulse events based on the comparison step such as by having the maximum and minimum meeting or exceeding a predefined criterion based on the known waveform. Hence, impulse events can be determined visually and/or computationally via the computerized condition monitor 100 and monitor 30.

Figure 7:
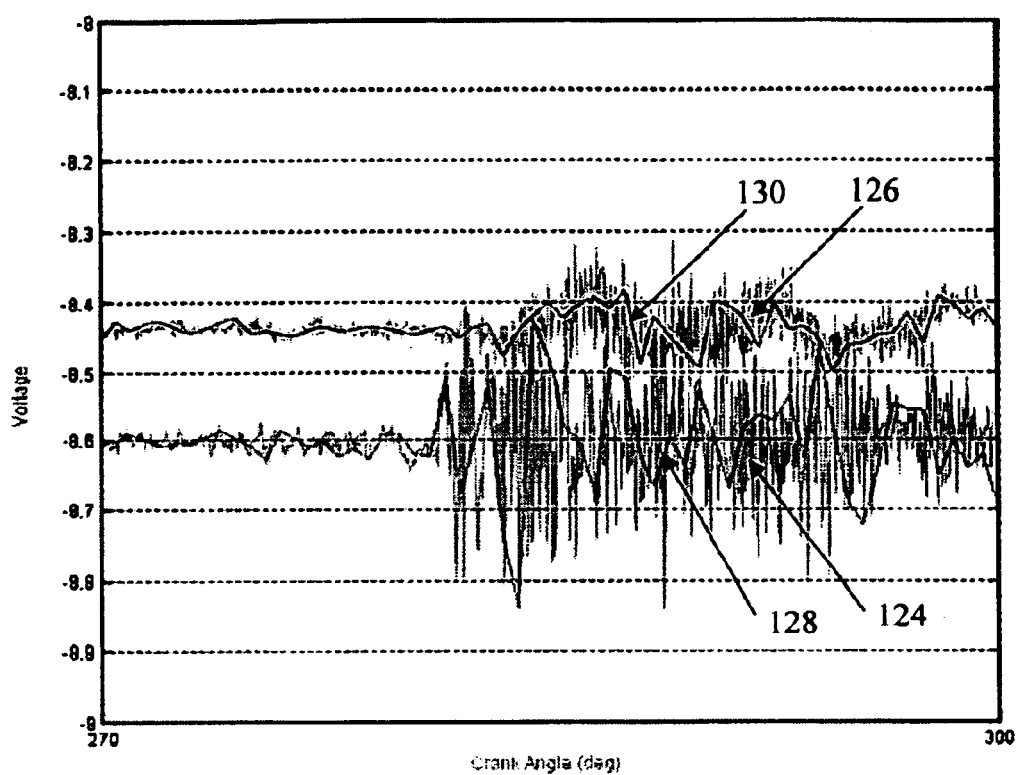
FIG. 7 is a graphical view of a selection of data from 270 to 300 degrees of rotation with the'selection being an overlay of the sample picked data plots shown in FIG. 5 on the 64,000 sampled data plots shown in FIG. 4.

FIG. 7 is a graphical view providing a better understanding of one embodiment of the invention by showing a selection of data from 270 to 300 degrees of rotation with the selection being an overlay of the sample picked data plots 128, 130 shown in FIG. 5 on the 64,000 sampled data plots 124, 126 shown in FIG. 4.

Figure 8:
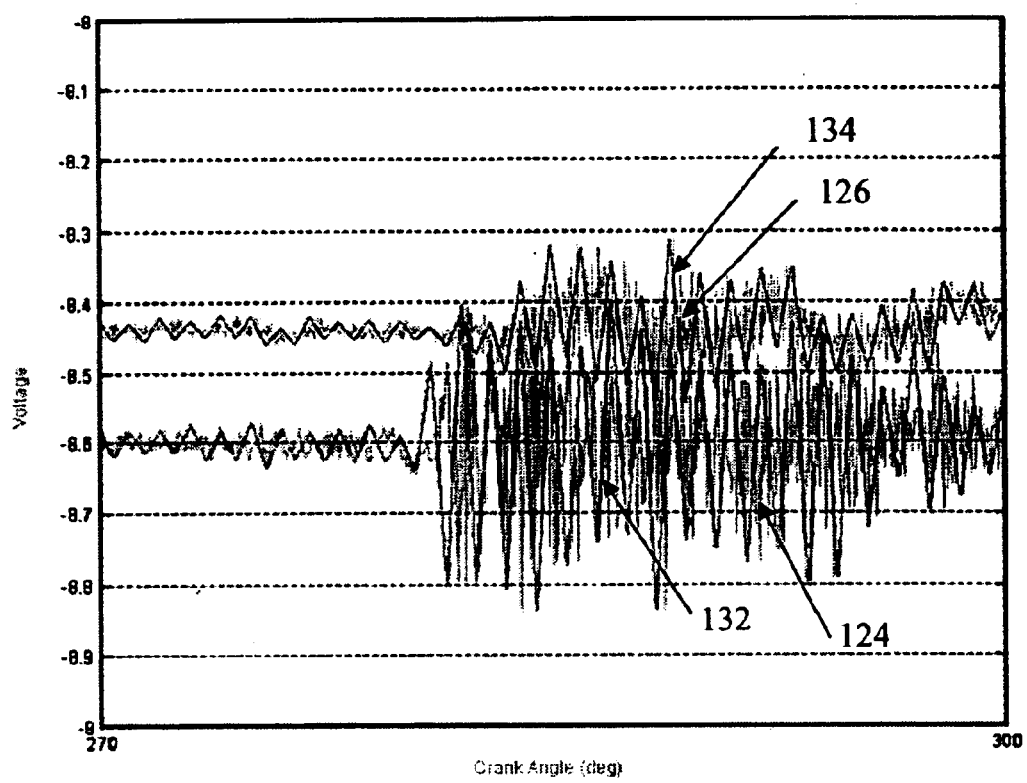
FIG. 8 is a graphical view of a selection of data from 270 to 300 degrees of rotation with the selection being an overlay of the transformed data plots shown in FIG. 6 overlaid on the 64,000 sampled data plots shown in FIG. 4.

FIG. 8 is a graphical view providing a better understanding of one embodiment of the invention by showing a selection of data from 270 to 300 degrees of rotation with the selection being an overlay of the transformed data plots 132, 134 shown in FIG. 6 overlaid on the 64,000 sampled data plots 124, 126 shown in FIG. 4. The maximum and minimum values for each degree of rotation are reflected in the plot shown in FIG. 9.

Figure 9:
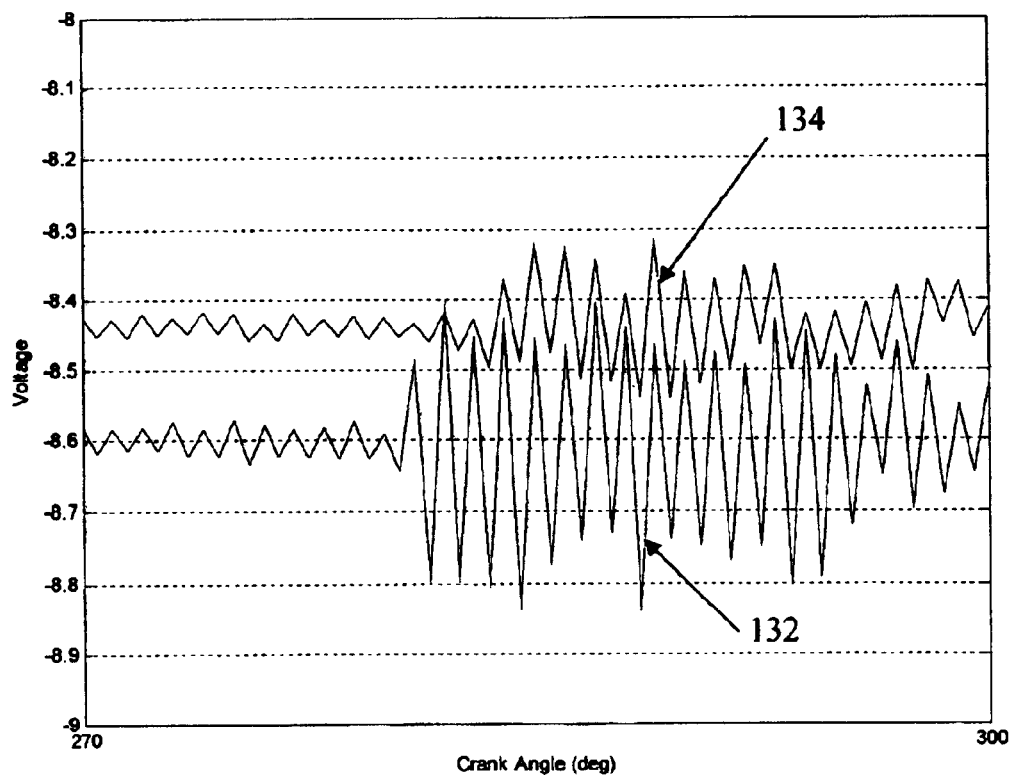
FIG. 9 is a graphical view of a selection of data from 270 to 300 degrees of rotation with the selection being the transformed data plots shown in FIG. 6 without the 64,000 sampled data plots shown in FIG. 4.

Specifically, FIG. 9 is a graphical view of a selection of data from 270 to 300 degrees of rotation with the selection being the transformed data plots 132, 134 shown in FIG. 6 without the 64,000 sampled data plots 124, 126 shown in FIG. 4 thereby more clearly showing the alternating maximum and minimum values plotted in FIG. 8 by leaving out the 64,000 sampled data plots 124,126 shown in FIG. 4.

One method embodiment of the invention for determining asset impulse events is to identify the sources of impulses so that action can be taken to manage machinery. Much of the high frequency signal is generated as acoustic noise in the process flow through piping, valves and in the cylinder. The high frequency signal is transmitted through the case and can give valuable information on valve leaks, restrictions or metal-on-metal rubs. Impulse events that excite the natural resonances occur at lower frequencies and can be masked by the high frequency acoustic noise. One method looks for the impulse events in a waveform that is filtered. Resonance frequencies occur in the several hundred hertz range, so if we filter the data with a cutoff of 1 kHz, the acoustic signals should be filtered out and the impulse events should be easier to locate.

Figure 10:
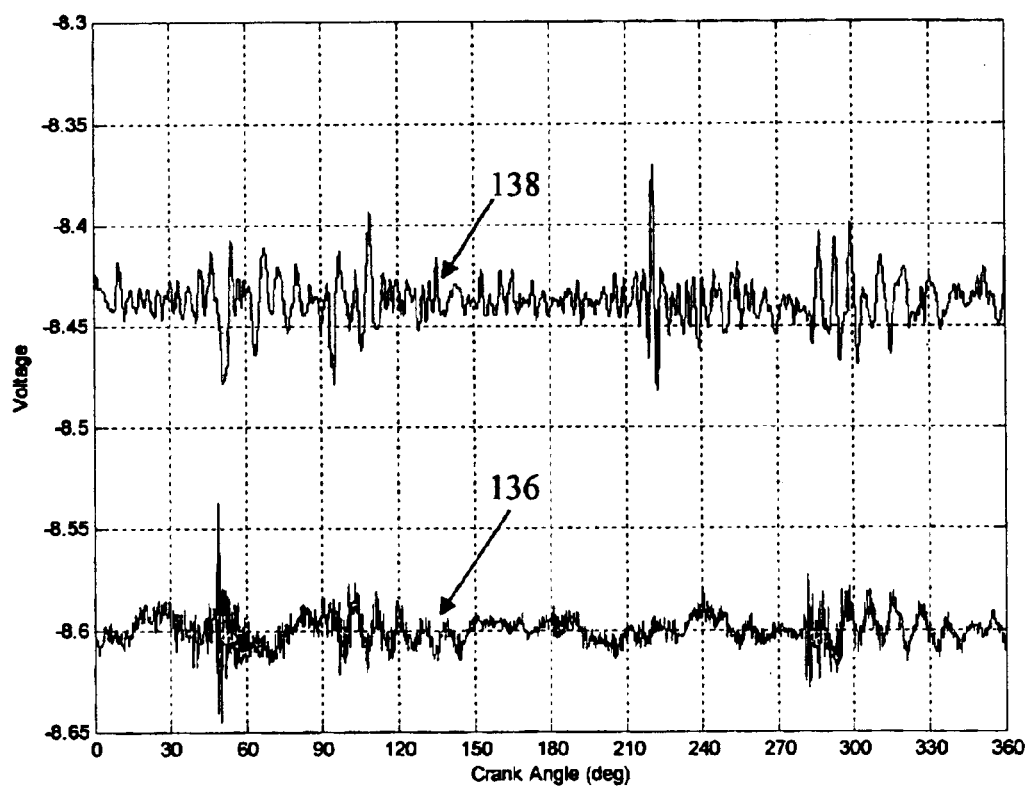
FIG. 10 is a graphical view of two plots obtained by passing the 64,000 sample data plots shown in FIG. 4 through a 1 kHz low pass filter.
Figure 11:
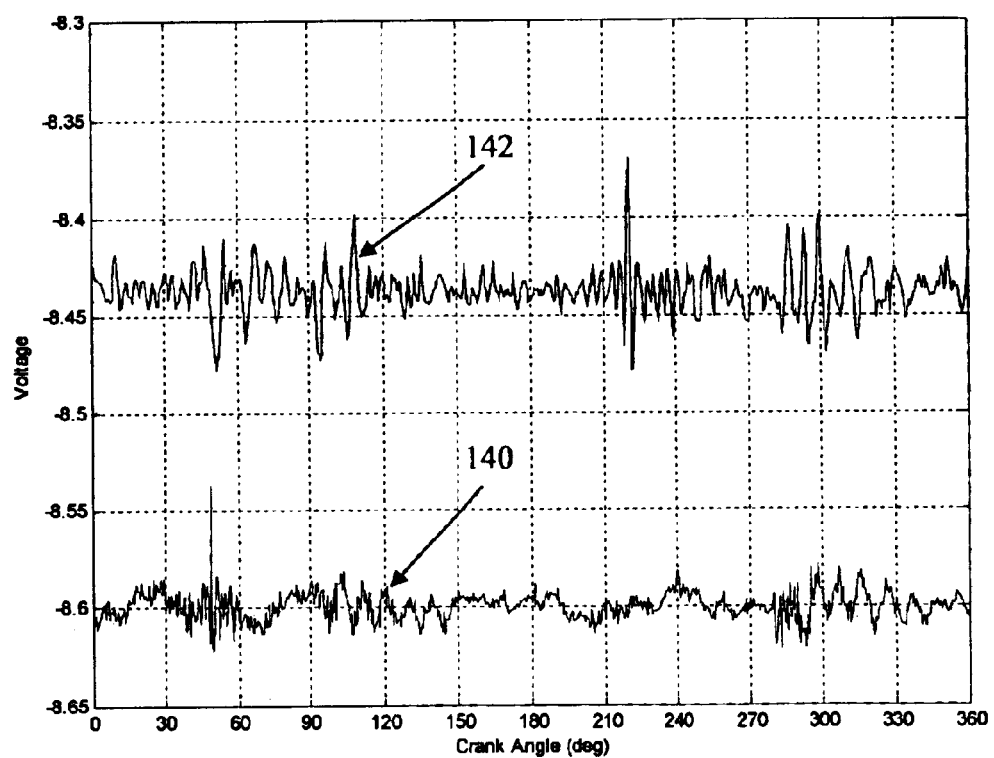
FIG. 11 is a graphical view of two 720-point sample plots obtained by picking 720 samples from each of the two 64000 samples per revolution plots which have been passed through the 1 kHz low pass filter.

Referring to FIG. 10, a graphical view is shown of two plots obtained from passing the same 64,000 sampled data plots shown in FIG. 4 through a 1 kHz low pass filter (Butterworth). Referring to FIG. 11, a graphical view is shown of two 720-point sample plots obtained by picking 720 samples from each of the two 64000 samples per revolution plots which have been passed through the 1 kHz low pass filter. Referring to FIGS. 10 and 11 reveals that some events appear to be retained in the waveform after the filtering but when we apply the 720-sample selection currently done in the monitors to this data the plot reveals differences between the plots (on the crosshead curve) around 50 degrees of rotation.

Figure 12:
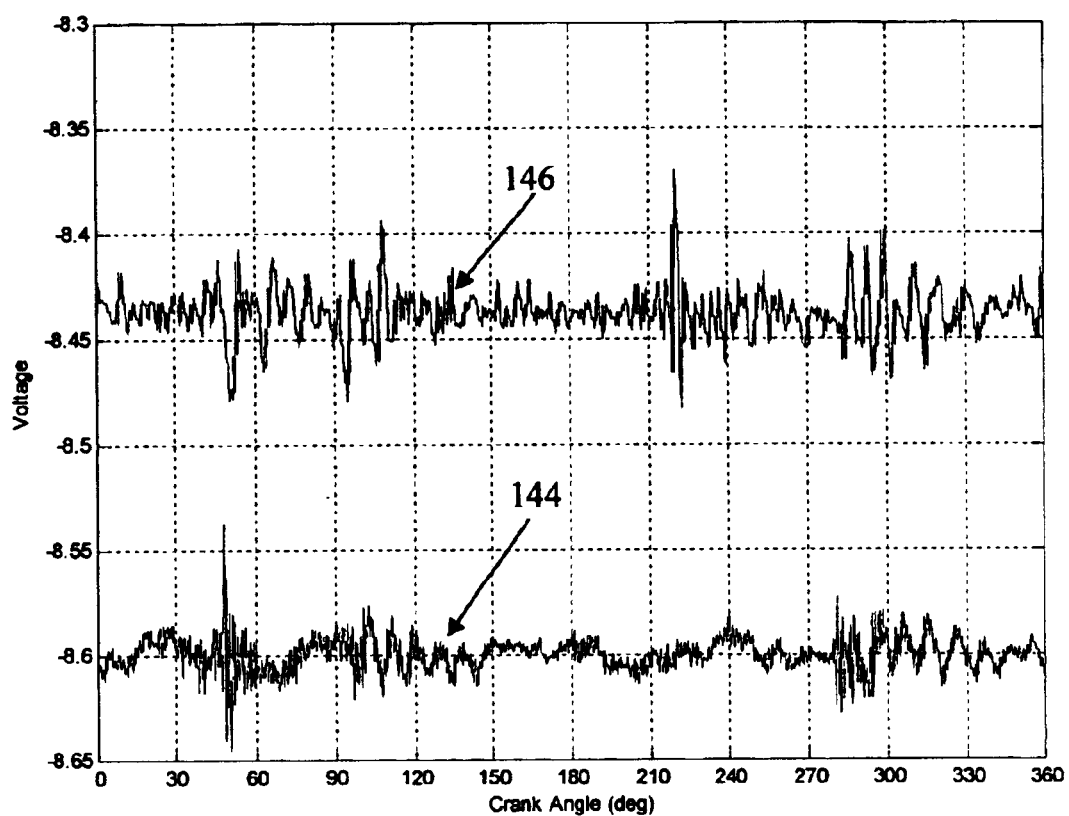
FIG. 12 is a graphical view of two 720-point sample plots obtained by picking 720 samples from each of the two results from the impulse monitoring system transforming each of the two 262,100 samples per revolution plots which have been passed through a 1 kHz low pass filter resulting in the data around 50 degrees being preserved better than in the sample picking methods.

Referring to FIG. 12, a graphical view is shown of two 720-point sample plots obtained by picking 720 samples from each of the two results from the impulse monitoring system transforming each of the two 262,100 samples per revolution plots which have been passed through a 1 kHz low pass filter resulting in the data around 50 degrees being preserved better than in the sample picking methods. Because the frequency content is lower, the aliasing is considerably less than when looking at the unfiltered signals.

Hence, the maximum/minimum transform will fit within the existing waveform data format of existing reciprocating compressor data presentations, gives a good representation of the modulation and allows event detection to the resolution needed to allow correlation between the max/min plot and others included in a reciprocating compressor plot group.

The typical monitoring system employed in the above example is a 3500 monitoring system manufactured and sold by Bently Nev., LLC located in Minden, Nev. U.S.A.

In use and operation, and referring to the drawings, one embodiment of the invention provides impulse monitoring system 10: apparatus and method which can be embodied in a machinery protection system monitoring rotating and/or reciprocating machines or mechanical systems. In this embodiment, the system 10 is operatively coupled to at least the one transducer 20 operatively coupled to the rotating or reciprocating machine M for monitoring the machine and outputting an analog signal to the system 10 indicative of machine status. The monitor 30 of system 10 includes analog to digital converter 40 operatively coupled to at least the one transducer 20 for receiving, sampling, and digitizing the outputted analog signal into a digitized signal. In turn, the A/D converter 40 is operatively coupled to processor 50 including a filter 72 for filtering the digitized signal and further including a Max/Min transform 70 for transforming the filtered digitized signal into a plurality of maximum and minimum sample or digital packets each having a maximum and minimum value taken from values of a plurality of samples of the filtered digitized signal taken during predefined degrees of rotation of a rotating element of the asset for defining a location and a maximum and a minimum value to each of the plurality of digital packets wherein each digital packet location is defined by each predefined degree of rotation of the rotating element thereby transforming the analog signal outputted by at least the one transducer 20 into the plurality of maximum and minimum sample or digital packets each having a unique identified location. The processor device 50 can then continue to compress the analog signal outputted by the transducer 20 by only storing, preferably consecutively, each maximum and minimum value of each sample packet and its associated location, for example, first a maximum and then a minimum per each predefined degree of rotation for defining a waveform of maximum and minimum values associated to a unique predefined degree of rotation. The monitoring system 30 may be used to compare the maximum and minimum values at particular locations to previously known values at the same location for determining impulse events based on the comparison step for providing machine protection.

The comparison step can also include displaying, for comparison, the defined waveform with a known waveform for visually or computationally determining impulse events via computerized condition monitor 100. Additionally, alarms can be generated based on determined impulse events in the form of, for example, automatically shutting down the machine being monitored by the transducer and/or automatically annunciating machinery problems to operators and other plant personnel.

Hence, in one aspect, the present invention provides a system 10: apparatus and method for identifying impulse events on machines by using inertial sensors with monitor 30 and computerized condition monitor 100 for detecting the higher frequency magnitudes of the impulse events and the position in the rotation (for rotating machinery) or the location of the piston in its stroke (for reciprocating machinery) when impulse events occur. Additionally, for the case of reciprocating compressors, individual alarm magnitude set point limits can be set for different banded crank angle increments. Further, banded crank angle increments can be set to "track" other machine events, such as rod reversal, suction valve opening or closing, discharge valve opening or closing, et cetera.

In another aspect, the present invention provides a system 10: apparatus and method that determines impulse events which occur in the operational cycle of the machine and compares their relative magnitudes to other events of the machine and/or relative to their own history (e.g. are they getting stronger or weaker) such that emerging problems are identified, correlated to a probable cause, and alleviated by a formulated proactive action.

In another aspect, the present invention provides a system 10: apparatus and method for processing asset data for retaining event timing to be able to accomplish event correlation (to other machine events such as suction and discharge valve operation, rod reversal, etc), and retaining relative magnitudes of the events so they can be compared historically to previous records for monitoring impulse events.

These aspects, among other things, demonstrate industrial applicability of this invention.

Moreover, having thus described the present invention, it should be apparent that numerous modifications and adaptations may be resorted to without departing from the scope and fair meaning of the present invention as set forth hereinabove and as described herein below by the claims.

We claim:

1. A method for determining impulse events of a machine correlative to machine status, the steps including:

monitoring a machine with at least one transducer outputting an electrical signal correlative to machine status;

sampling said electrical signal into a digitized signal;

transforming said digitized signal into a plurality of digital packets by determining for each of said plurality of digital packets a maximum and a minimum value of said digitized signal taken over a sampling range correlated to a predefined degree of rotation of a rotating element of the machine and each of said plurality of digital packets having a location defined by the correlated predefined degree of rotation of the rotating element over which said electrical signal was sampled;

comparing said values of said plurality of digital packets to known values;

determining impulse events based on the comparison step, and alarming off each determined impulse event as warranted for by criteria of the comparison step.

2. The method of claim 1 further including a step of filtering said digitized signal prior to the transforming step for defining a filtered digitized signal.

3. The method of claim 2 further including a step of storing said plurality of digital packets transformed from said filtered digitized signal into a digital waveform, displaying said digital waveform on a computer, and comparing said displayed digital waveform to at least one known and displayed waveform for determining impulse events based on the comparison step.

4. The method of claim 3 further including the step of alarming off each determined impulse event as warranted for providing machine protection.

5. The method of claim 4 further including means for informing plant personal for each determined impulse event as warranted for providing machine protection.

6. The method of claim 1 wherein the monitoring step includes the step of monitoring vibration of a rotating machine with at least one acceleration transducer outputting an electrical signal correlative to rotating machine status.

7. The method of claim 6 wherein said transforming step includes transforming said digitized signal into said plurality of digital packets each having said location that is a position in rotation of a rotating element of the rotating machine for use in determining an event timing to be able to accomplish event correlation to other machine events and each having maximum and minimum values for maintaining relative magnitudes of the events so they can be compared historically to previous records.

8. The method of claim 1 wherein the monitoring step includes the step of monitoring vibration of a reciprocating machine with at least one acceleration transducer outputting an electrical signal correlative to reciprocating machine status.

9. The method of claim 8 wherein said transforming step includes transforming said digitized signal into said plurality of digital packets each having said location that is a location of a piston in its stroke in the reciprocating machine for use in determining an event timing to be able to accomplish event correlation to other machine events and each having maximum and minimum values for maintaining relative magnitudes of the events so they can be compared historically to previous records.

10. An apparatus for determining impulse events of a machine from a electrical signal outputted by a transducer monitoring the machine, said apparatus comprising in combination:

an analog to digital converter operatively coupled to the transducer for sampling and digitizing said electrical signal into a digitized electrical signal;

a processor operatively coupled to said sampling device for receiving said digitized electrical signal and including means for transforming the digitized electrical signal into a plurality of digital packets each having a maximum and a minimum value taken over a sampling range correlated to a predefined degree of rotation of a rotating element of the machine and each of said plurality of digital packets having a location defined by the correlated predefined degree of rotation of the rotating element over which said electrical signal was sampled;

said processor further including means for comparing the plurality of maximum and minimum values of said plurality of digital packets and their respective locations to known values;

means for determining impulse events based on the comparison step, and means for alarming off each determined impulse as warranted for providing machine protection.

11. The apparatus of claim 10 further including a filter operatively coupled to said analog to digital converter and to said processor for filtering said digitized signal prior to transforming the digitized electrical signal into said plurality of digital packets.

12. The apparatus of claim 11 further including the step of storing a fraction of said plurality of digital packets transformed from said filtered digitized signal into a digital waveform for compressing said filtered digitized signal, displaying said digital waveform on a computer, and comparing said displayed digital waveform to at least one other known and displayed waveform for determining impulse events based on the comparison step.

13. The device of claim 10 further including means for informing plant personal for each determined impulse as warranted for providing machine protection.

14. The device of claim 13 wherein the machine is a rotating or reciprocating machine.

15. An impulse event detection system comprising, in combination:

at least one transducer operatively coupled to an asset for measuring physical asset parameters and outputting an electrical signal correlative to asset status;

a sampling device, connected to said transducer, for sampling and digitizing said electrical signal into a digitized signal;

a first processor operatively coupled to said sampling device for receiving said digitized signal and transforming said digitized signal into a plurality of digital packets each having a maximum and a minimum value taken over a sampling range having a predefined degree of movement of a moving element of the asset and each of said plurality of digital packets having a location defined by the predefined degree of movement of the moving element over which said electrical signal was sampled, and a second processor operatively coupled to said first processor and including means for comparing the plurality of maximum and minimum value data packets and their respective locations to known values and including means for determining impulse events based on the comparison step.

16. The system of claim 15 further including means for alarming off each determined impulse event as warranted for providing asset protection.

17. The system of claim 16 further including means for informing plant personal for each determined impulse as warranted for providing asset protection.

18. The system of claim 17 wherein the asset is a rotating or reciprocating machine.

* * * * *